Figure 1:
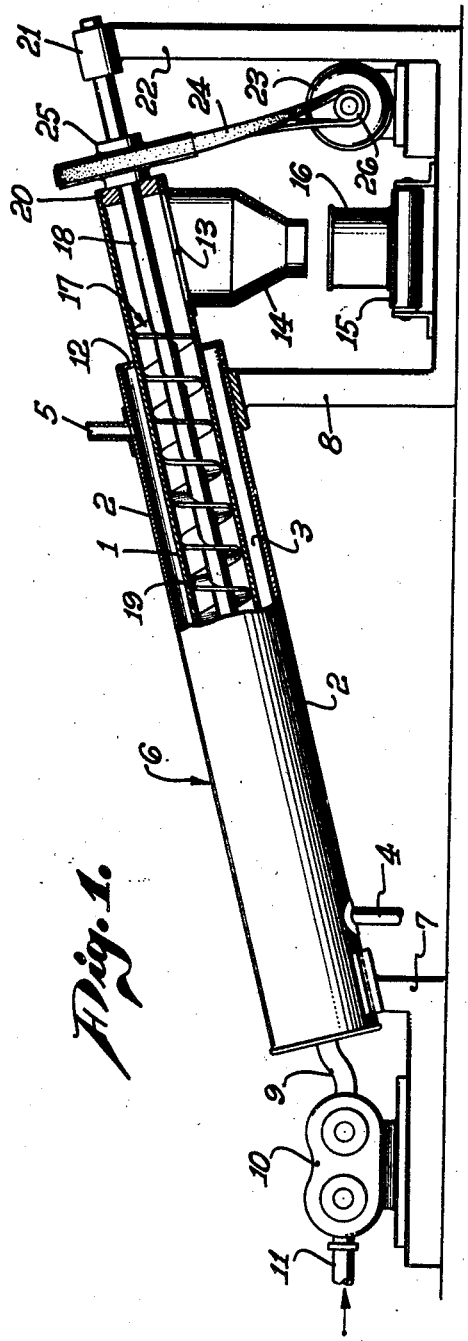

Aug. 26, 1947. W. W. MAYNE ET AL 2,426,368
APPARATUS FOR FREEZING LIQUIDS
Filed Dec. 27, 1943

WALTER W. MAYNE,
KENNETH A. MURPHY
INVENTORS.

BY
ATTORNEY.

Patented Aug. 26, 1947

2,426,368

UNITED STATES PATENT OFFICE 2,426,368

APPARATUS FOR FREEZING LIQUIDS

Walter W. Mayne and Kenneth A. Murphy, Pasadena, Calif., assignors, by mesne assignments, to Pre-Pak Freezer Corporation, Los Angeles, Calif., a corporation of California Application December 27, 1943, Serial No. 515,860

2 Claims. (Cl. 62—114)

Our invention relates to apparatus for freezing heterogeneous mixtures and has particular reference to apparatus for quick freezing fruit and vegetable juices such as, for example, orange juice.

It has been found that great saving in transportation costs and great improvement in the facility with which fruit and vegetable juices may be dispensed can be obtained by extracting the juice from the fruits and vegetables and freezing them before they are transported to the point of consumption. In order to preserve all of the food values and vitamins and to prevent unduly rapid spoiling upon thawing, it is essential that the juices be frozen as rapidly as possible. This process has come to be known as "quick freezing."

Prior to our invention it was the practice to quick freeze the juice of fruits and vegetables by filling metal containers with the extracted juice and then rapidly refrigerating the metal containers. This process has a number of disadvantages, not the least of which is the requirement that the containers used be relatively small in order to obtain a sufficiently rapid freezing of the entire contents of the container. Furthermore, since the juices are introduced into the containers in liquid form, it is desirable that the containers be made of metal since the thermal conductivity of other container materials is so low as to make it impractical to obtain a sufficiently rapid freezing with paper, cardboard or plastic containers. In war time when supplies of iron and tin are used exclusively in the production of munition and ordnance, it is impossible to obtain an adequate supply of cans for use in the above mentioned processes.

It is, therefore, an object of our invention to provide apparatus for quick freezing liquid heterogeneous mixtures such as fruit and vegetable juices which overcomes the above mentioned disadvantages by making it practical to use non-metallic containers.

It is also an object of our invention to provide for quick freezing fruit and vegetable juices by preliminarily rapidly refrigerating the juice in bulk to a temperature such that there is produced a thick paste substantially free from occluded air, the paste then being placed in non-metallic containers and refrigerated sufficiently to complete the freezing of the air free juice, whereby subsequent oxidation of the juice content is maintained at a minimum.

It is a still further object of our invention to provide apparatus for freezing of the character set forth in the preceding paragraph in which the entire process is carried out within an enclosure which is substantially free of air to thereby eliminate the oxidation of the oxidizable elements of the juice.

It is additionally an object of our invention to provide an apparatus for quick freezing liquid heterogeneous mixtures which includes a means for rapidly refrigerating liquids in bulk to a point such that a relatively thick paste is produced.

It is also an object of our invention to provide an apparatus of the character set forth in the preceding paragraph which includes a means for producing a continuous flow of the juice in both the liquid and paste form through the refrigerating chamber.

It is additionally an object of our invention to provide an apparatus of the character set forth hereinbefore which includes a means for continuously maintaining a partial vacuum within the space in which the juices are refrigerated.

Figure 2:
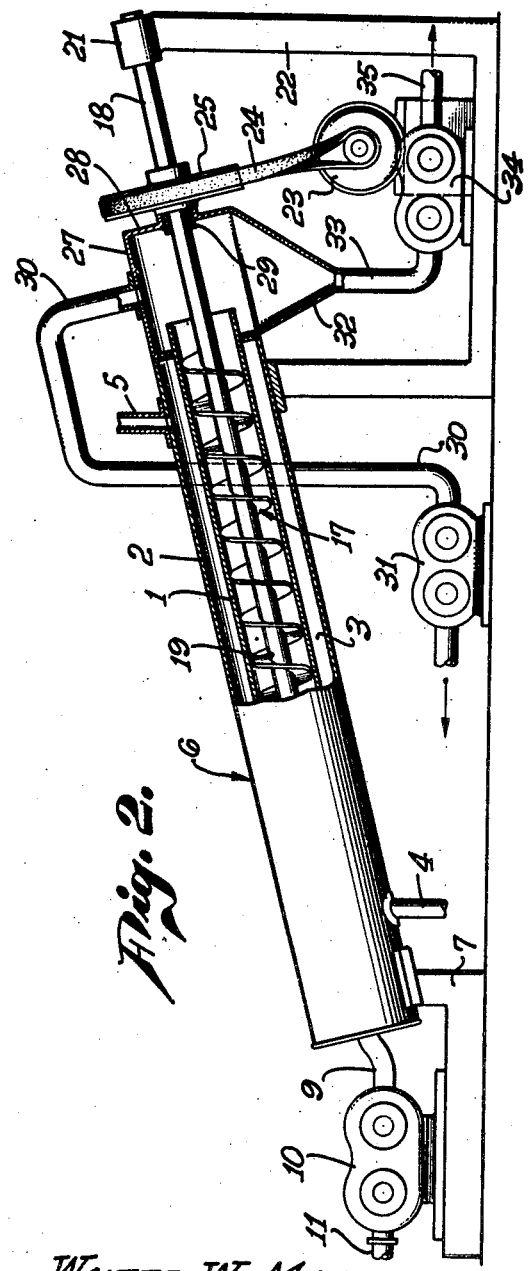

Other objects and advantages of our invention will be apparent from a study of the following specifications, read in connection with the accompanying drawings, wherein:

Fig. 1 is a diagrammatic elevational view with parts shown in section and illustrating one form of apparatus which is particularly adapted to the practice of our invention; and Fig. 2 is a view similar to Fig. 1 but illustrating a modified form of apparatus particularly adapted to the practice of an improved form of our invention.

As before stated, it is essential in the quick freezing of vegetable and fruit juices that the heat of the liquid and the latent heat of solidification be removed so rapidly as to prevent the formation of large crystals and the destruction of the individual cells of the pulp which is always carried by such juices. According to the method of our invention this is accomplished by introducing the fruit or vegetable juice or other liquid heterogeneous mixture into a very low temperature refrigerating chamber and moving the liquid through that chamber continuously at such a rate that it will be discharged from the chamber in the form of a heavy paste.

The paste form of the refrigerated liquid results from the fact that a part of the constituents of the liquid freeze at a temperature somewhat higher than that required to freeze all of the constituents. The paste is then placed in suitable containers, preferably made of cardboard or other non-metallic material. The containers are sealed and placed within a refrigerated storage room, the temperature of which is maintained sufficiently low to accomplish the final freezing and hardening of the frozen juices in a relatively short time.

With this method it is possible to use containers of shapes other than the conventional cylindrical shape. The juices may, for example, be packed in rectangular paper cartons, thus effecting not only a material saving in cost as regards the container used, but also effecting a considerable saving in transportation charges resulting from the reduction in weight effected by substituting a paper or cardboard container for the metal can and resulting also from the fact that the rectangular packages may be packed side by side without the waste of space which is attendant upon the side by side placing of cylindrical containers.

In the freezing of certain vegetable and fruit juices and notably the citrus juices such as orange, lemon and grapefruit juices, it is found that the time between the extraction of the juice and the freezing of the juice must be maintained as short as possible if the juice is in contact with the air because during the contact of the juice with the air certain elements of the juice oxidize with great rapidity resulting in a partial destruction of the vitamin content and the development of distasteful terebinthinate odors and flavors.

We have found that even though the freezing of the juice be accomplished in a relatively short time, it is necessary to prevent the mixing of air with the juices during the freezing process for the reason that any air which is mixed with the juices during the freezing process will result in oxidation of the juice during the time the frozen juice is in storage. Accordingly any agitation of the juice during freezing must be so controlled as to prevent the whipping into the juice of any air. We prefer to prevent the inclusion of air into the frozen juice by preventing any whipping action and by operating any agitators or set screws at a speed sufficiently low to insure that no air will be whipped into the juice.

The difficulty of oxidizing certain of the juice elements may also be avoided according to our invention by introducing the juice into the freezing chamber immediately after the juice is extracted from the fruit and by maintaining the freezing chamber under vacuum so that a very large percentage of the air is removed from the chamber and the freezing process takes place in a rarefied atmosphere providing little or no oxygen to oxidize the oxidizable elements of the juice. Alternatively, the process may be carried out in an inert atmosphere of nitrogen, neon, argon or the like.

We have shown in Fig. 1 an apparatus which is particularly adapted to the practice of our invention. The apparatus comprises a tubular freezing chamber 1 which is surrounded by a concentric jacket 2 defining an interior annular space 3. Within the space 3 there is circulated a refrigerant as by means of an inlet pipe 4 and a discharge pipe 5. The space 3 may, if desired, constitute the evaporator of a conventional refrigerating system in which case liquid refrigerant such as liquid ammonia, Freon or sulphur dioxide is introduced into the inlet 4 and the gaseous refrigerant resulting from the vaporization of the liquid refrigerant is returned to the compressor through the discharge line 5 which is connected to the suction side of the refrigerating compressor. Alternatively, there may be circulated through the space 3 by means of the connections 4 and 5 a refrigerated liquid such as alcohol or a calcium chloride solution.

The refrigerator comprising the tubular member 1 and outer jacket 2 and indicated in Fig. 1 generally by the reference character 6 is preferably supported in a sloping position as shown in Fig. 1 as by means of supports 7 and 8. Liquid to be frozen is introduced into the lower end of the chamber 1 through a conduit or pipe 9, the same being preferably connected to the discharge of a pump 10 shown as comprising a gear pump. The inlet 11 of the pump comprises a conduit which is connected to the collector basins of the juice extracting apparatus used to extract the juice of the particular fruit or vegetable being treated.

The pump 10 may comprise any suitable type of pump and need only operate to insure an adequate supply of liquid into the freezing chamber 1, a back pressure on the pump 10 of from five to ten pounds per square inch is usually sufficient.

The freezing chamber 1 is extended upwardly beyond the closed end 12 of the refrigerating jacket 2 and is provided at its outer end with an opening 12 in the under side communicating with a funnel or discharge hopper 14 which is preferably placed above a belt conveyor or table 15 upon which cartons or containers 16 may be placed in a position to receive the material discharged from the upper end of the refrigerating chamber 1.

In order to insure a continuous flow of the material through the chamber 1 and to provide a scraping action along the inside surfaces of the chamber 1 to prevent the material from freezing up permanently and hard, we place within the chamber 1 a screw or Archimedes spiral 17 which comprises a drive shaft 18 and a helically wound vane 19 substantially filling the chamber 1. We have found that a clearance between the outer surface of the vane 19 and the inner surface of the chamber 1 of 0.010 of an inch is suitable for the refrigeration of orange juice.

The shaft 18 is journaled for rotation as by means of a bearing block 20 inserted in the end of the chamber 1 and as by means of an outboard bearing 21 mounted upon a suitable supporting post 22. An electric motor 23 or other suitable power means may be used to rotate the screw 17 as by means of a belt 24 and pulleys 25 and 26.

The following description of the method and the functioning of the above described apparatus is made with reference to the freezing of orange juice, it being understood that slight changes in temperatures and operating speeds will be required in the treatment of other heterogeneous mixtures. The orange juice may be introduced into the freezing chamber 1 at normal room temperature or, if desired, it may be pre-cooled to a temperature approximately 35° F If a refrigerant temperature within the space 3 of approximately 10° F. is maintained, a thick paste having a temperature of about 25° F. may be discharged through the hopper 14 by providing the screw 17 with a four inch lead and rotating it at a speed of approximately 15 R. P. M. Other refrigerating temperatures and other screw pitches will, of course, require a somewhat different speed of rotation of the screw in order to obtain a discharge of the juice from the machine at the desired temperature of about 25° F. In every case, however, the speed of the screw 17 should be maintained at a sufficiently low value to prevent whipping air into the juice to thereby reduce to a minimum the oxidation of the oxidizable elements of the juice.

As soon as the container 16 is filled with the quickly frozen juice in the paste form, the same is sealed and immediately placed in a hardening room in which a temperature of from zero to minus 10° F. is maintained. Storage at such temperature from four to twenty four hours will result in a complete hardening of the material, the time required depending upon the size of the container used and the amount and effectiveness of the air circulation within the hardening room.

In order to reduce to a minimum the oxidation of the juice during the freezing operation, we may employ a modified form of apparatus constructed along the lines illustrated in Fig 2. The apparatus shown in Fig. 2 is identical with that shown in Fig. 1 with the exception of the mechanism used in the discharge end of the chamber 1. It will be noticed that the chamber 1 is arranged to discharge into an enclosure defined by a housing 27. The shaft 18 is extended through an end wall 28 of the housing 27 and an air-tight seal is provided between the housing 27 and the shaft 18 as by means of a seal or gland 29.

From the upper side of the housing 27 there is extended an exhaust line 30 which is connected to the suction side of a vacuum pump 31. This pump serves to continually remove from the housing 27 and from the interior of the chamber 1 air that may be present or be introduced with the juice as it is introduced into the lower end of the chamber. The lower part of the housing 27 is preferably made funnel-shaped as shown at 32 and connected as by means of a conduit 33 to a discharge pump 34 which serves to remove the juice in its paste form from the funnel or hopper 32 and provide a seal preventing the influx of air into the chamber 27 through the aperture serving as the discharge for the frozen juices. The discharge side of the pump 34 may be connected as by means of a conduit 35 to any suitable type of apparatus which may be used to fill containers such as the container 16.

From the foregoing it will be observed that we have provided for novel quick freezing liquid heterogeneous mixtures, particularly fruit and vegetable juices and that our invention permits a more economical treatment of the liquids to be frozen than is possible with existing apparatus.

It will be further noted that by using our invention packaging of the frozen commodity in non-metallic containers is permitted. The apparatus which we have shown is distinguished by its simplicity and by the provision of the screw 17, as a means for mechanically moving the liquids through the freezing chamber as the freezing process continues, to avoid necessity of using high pressure pumps and to absolutely prevent the freezing up of the machine due to the liquid sticking to the walls of the freezing chamber.

While we have shown and described the preferred embodiment of our invention, we do not desire to be limited to any of the details of construction shown or described herein, except as defined in the appended claims.

We claim:

1. In an apparatus for rapidly freezing a liquid heterogeneous mixture, the combination of: an elongated freezing chamber; means for refrigerating said freezing chamber to a temperature substantially below the freezing points of the constituents of said mixture; means for introducing liquids to be frozen into one end of said chamber; means for moving said liquids through said chamber at a rate adjusted to discharge said liquids from the other end of said chamber at a temperature below the freezing point of a part of the constituents of said mixture and above the freezing point of the remainder of said constituents; and means for exhausting the interior of said chamber to maintain a pressure therein substantially less than atmospheric.

2. In an apparatus for rapidly freezing a liquid heterogeneous mixture, the combination of: an elongated tubular freezing chamber; a refrigerating jacket surrounding said chamber; means for supplying refrigerant to said jacket at a temperature substantially below the freezing points of the constituents of said mixture; means for introducing said mixture into one end of said chamber; screw means mounted for rotation in said chamber to advance said liquids from one end to the other thereof; means for rotating said screw means at a speed adjusted to discharge said liquid from the other end of said chamber at a temperature such that said liquid is in a paste-like form; a closed receiving chamber communicating with the other end of said freezing chamber; means for exhausting said receiving chamber and said freezing chamber to maintain therein a pressure substantially less than atmospheric; and pump means communicating with said receiving chamber for withdrawing therefrom material received therein from said freezing chamber.

WALTER W. MAYNE.
KENNETH A. MURPHY.

REFERENCES CITED

The following references are of record in the file of this patent:

UNITED STATES PATENTS

| Number | Name | Date |
| --- | --- | --- |
| 2,117,215 | Ruch | May 10, 1938 |
| 2,059,065 | Tuscan et al. | Oct. 27, 1936 |
| 2,228,999 | Birdseye | Jan. 14, 1941 |
| 1,783,864 | Vogt | Dec. 2, 1930 |
| 1,910,009 | Grayson | May 23, 1933 |
| 2,302,169 | Baker | Nov. 17, 1942 |